United States Patent [19]
Wright

[11] 4,184,738
[45] Jan. 22, 1980

[54] LIGHT COUPLING AND MODULATING MEANS

[75] Inventor: Stephen Wright, London, England

[73] Assignee: International Standard Electric Corporation, New York, N.Y.

[21] Appl. No.: 874,590

[22] Filed: Feb. 2, 1978

[30] Foreign Application Priority Data

Feb. 22, 1977 [GB] United Kingdom ............... 07370/77

[51] Int. Cl.² .............................................. G02B 5/14
[52] U.S. Cl. .............................. 350/96.14; 350/96.13; 350/96.15
[58] Field of Search ............... 350/96.11, 96.12, 96.13, 350/96.14, 96.15, 96.17

[56] References Cited
U.S. PATENT DOCUMENTS

| 3,864,019 | 2/1975 | Smolinsky et al. ........... 350/96.15 X |
| 3,978,426 | 8/1976 | Logan et al. ................... 350/96.11 X |
| 4,006,964 | 2/1977 | Mahlein et al. ................ 350/96.12 X |
| 4,092,060 | 5/1978 | Nunoshita et al. ................ 350/96.13 |

Primary Examiner—John K. Corbin
Assistant Examiner—John D. Lee
Attorney, Agent, or Firm—John T. O'Halloran; Peter C. Van Der Sluys

[57] ABSTRACT

A light coupler and modulator for an optical waveguide is formed using a slab of optically transmissive material having a higher index of refraction than the waveguide. The slab has tapered ends for receiving and transmitting light from and to the waveguide. An electrode is disposed over the slab for the application of modulating signals to the slab. When used as a coupler, the ends of two waveguides to be coupled also have tapered ends that are overlapped by the slab with the tapered ends of the slab extending beyond the taper of the waveguides.

16 Claims, 11 Drawing Figures

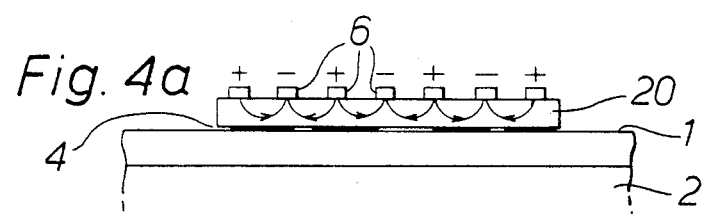
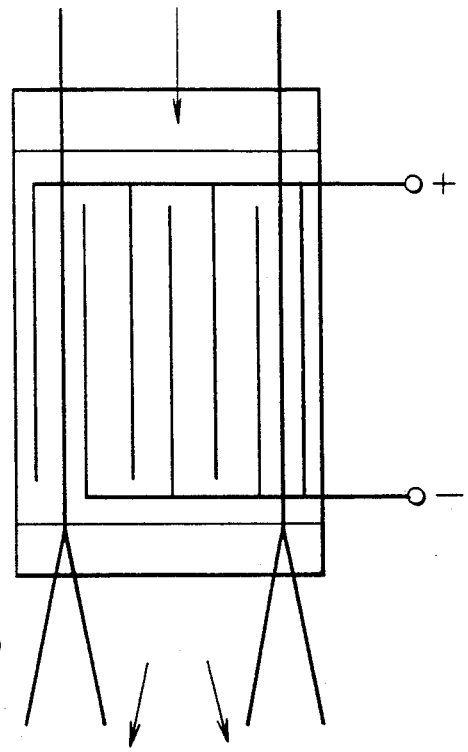
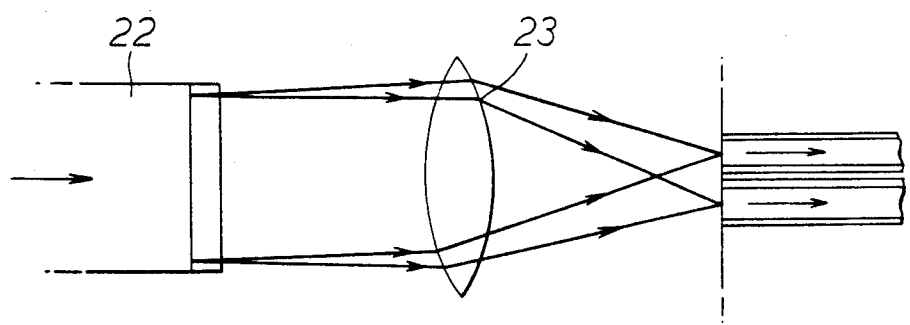

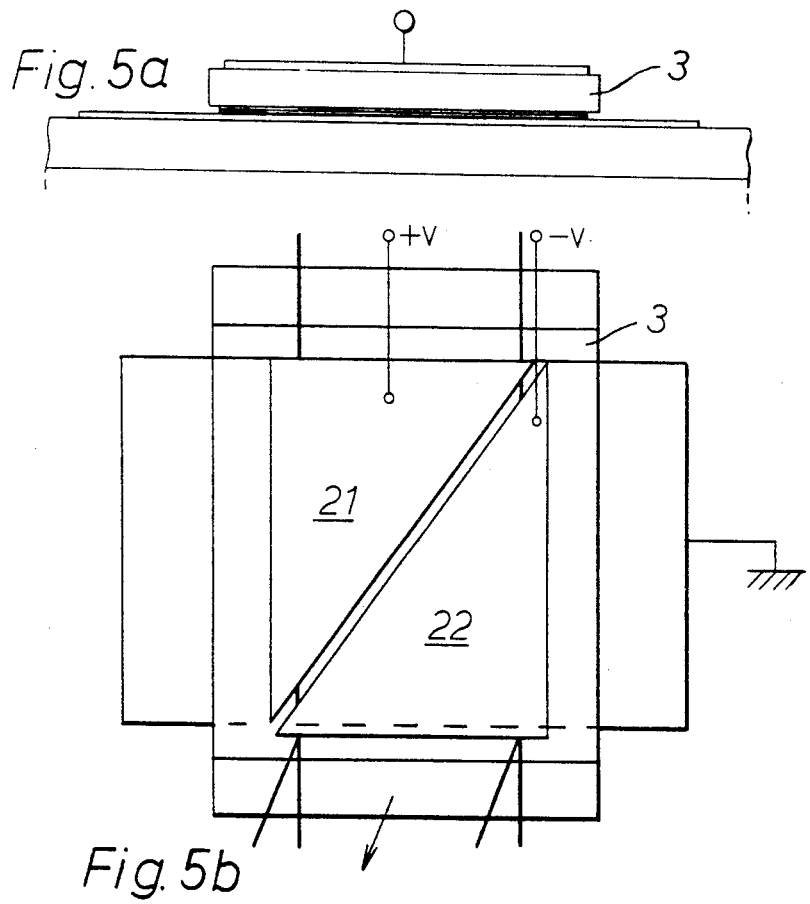
Fig.5a
Fig.5b
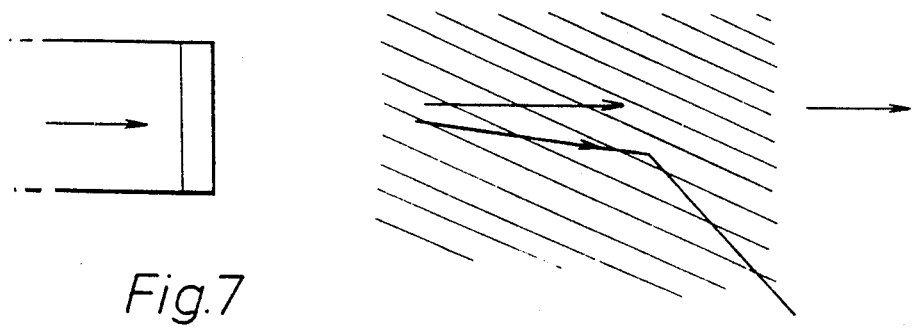
Fig.7

LIGHT COUPLING AND MODULATING MEANS

FIELD OF THE INVENTION

This invention relates to apparatus for coupling modulating light being transmitted in an optical communication system.

SUMMARY OF THE INVENTION

According to the present invention there is provided apparatus for modulating and/or switching light in an optical waveguide, in which the optical waveguide is made from optically transmissive material deposited on a substrate whose refractive index is less than that of the waveguide material, in which a slab of an optically transmissive material whose refractive index is higher than that of the waveguide material is deposited on the waveguide material, said slab having tapered regions at each of its ends so as to enable the transfer of light from the waveguide into the slab at one end and the transfer of light from the slab into the waveguide at the other end, in which the dimensions of said waveguide and of said slab are such as to permit multimode light transmission and in which electrodes are applied to the outer face of said slab to which electrical signals are applied to modulate the light in said waveguide.

According to another aspect of the invention there is provided apparatus for coupling two optical waveguides, both of which are located on a substrate, said waveguides being made of materials whose refractive indices exceed that of the substrate in which each said waveguide has a tapered end-portion, in which optically transmissive material having a higher refractive index than the refractive indices of said waveguides is deposited over the ends of the waveguides so as to interconnect them, the ends of the deposited region being tapered, and in which the dimensions of said waveguides and of said deposited region are such that multi-mode light transmission is possible.

It will be appreciated that the above two aspects of the invention can be used together, i.e. in a coupler the coupling region can be provided with electrodes to which electrical signals are applied for modulating or switching the light in transmission.

It is an objective of the present invention to provide a light modulator for an optical communication system.

It is another objective of the present invention to provide a light switch for an optical communication system.

It is another objective of the present invention to provide a coupler for an optical communication system that also provides modulation and switching capability.

BRIEF DESCRIPTION OF THE DRAWINGS

FIGS. 4a and 4b show in section and plan a modulation arrangement embodying the invention and using a diffraction modulator.

FIGS. 5a and 5b show in section and in plan a switching arrangement embodying the invention and using an optical prism modulator.

FIGS. 6 and 7 show how the output beams can be separated.

DESCRIPTION OF THE INVENTION

The arrangements described herein are, in effect, intermediate between bulk optical modulator switches and fully monolithic devices. Modulation is achieved through interaction with an electrically-induced phase grating in the crystal, which diffracts the light as a voltage is applied to an interdigitated electrode structure. This grating interaction can also be used for switching, since optical power is channelled among the different diffracted orders by the interaction. Other interaction geometries may be used—e.g. prism-shaped electrodes, FIG. 5, to deflect the beam as a voltage is applied, and this method is more attractive if a switching function is required. Physical effects other than the electro-optic effect may be used. A general problem, however, is to form an optical waveguide in a material with useful physical properties, particularly if wide guides with large index differences are required (as in multimode fibre systems). In this case, the limitations of deposition or diffusion processes may be reached.

For multimode fibre systems, where the typical fibre core dimension might be 20–50 $\mu$m, an alternative approach is possible, since guides of this dimension may be fabricated by polishing down the bulk material. In a modulator or switch using any kind of diffraction or deflection switching, however, this is not sufficient, as the guiding structures needed which would have to be fabricated from the bulk material would be highly complex. In the present arrangement, these functions (e.g. adjusting the input beam width and divergence, separating the output beams, adjusting the output for efficient coupling to a fibre, etc.) are performed in an optical circuit fabricated in a glass substrate by ion exchange techniques. Modulation is effected by coupling to a waveguide of the active material, the active waveguide being formed by lapping and polishing a piece of bulk material down to the required thickness. The refractive index of the 'active' material should be higher than that of the ion exchanged waveguide, but this is generally the case (e.g. for lithium niobate $LiNbO_3$, n=2.18). Moreover, it must be thick enough to support as many, or more, depth modes than the ion-exchanged waveguide. If the ends of the high index slab are tapered generally from zero to the final thickness over very many wavelengths (i.e. a few mm), the guided energy in any particular mode of the glass guide transfers smoothly to the corresponding mode of the slab.

Figure 1A:
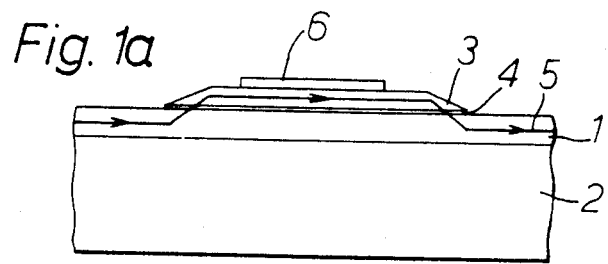
FIGS. 1a and 1b show in section a modulator/switch and a coupler each embodying the invention.

In FIG. 1a the optical waveguide 1 is formed on one face of a substrate 2 which is also of an optically transmissive material, although its refractive index is lower than that of the waveguide material. On the surface of the waveguide there is a block 3 of a crystalline material such as $LiNbO_3$, which has a refractive index greater than that of the waveguide material. This block is bonded to the waveguide surface by a thin layer 4 of a bonding material whose refractive index is greater than that of the waveguide material but less than that of the block 3. The crystal block 3 has its ends tapered as shown, to facilitate the entry of the light into and its exit from the block 3. As a result, light being propagated along the guide 1 travels over the path indicated by the arrow 5. To modulate the light while it is negotiating the crystal block 3, electrical signals are applied to an electrode or electrode structure indicated schematically at 6.

Figure 1B:
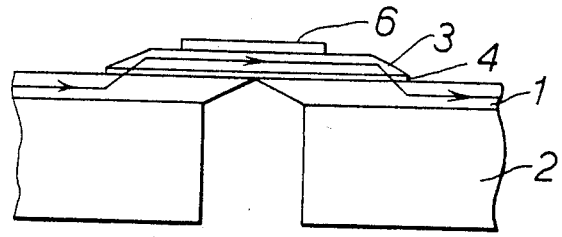

Note that if the block 3 is used to couple two waveguides, it overlaps their ends, and each of the ends is itself tapered, with the taper on the block 3 overlying full-depth portions of the guide 1 as shown in FIG. 1b. In this case, the functions of modulation and coupling can be combined.

The depths of the waveguide 1 and the block 3 are so chosen that the arrangement will propagate multimode light.

Figure 2A:
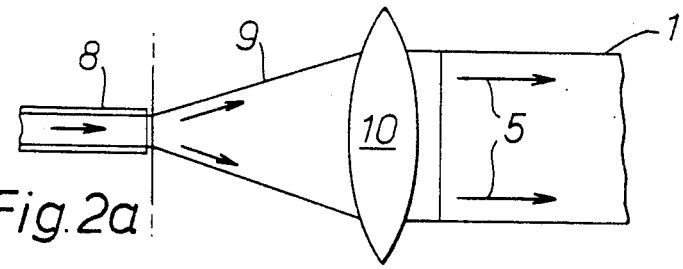
FIGS. 2a and 2b show in plan and section the coupling of an optical fibre to an optical waveguide which conveys light to be modulated.
Figure 2B:
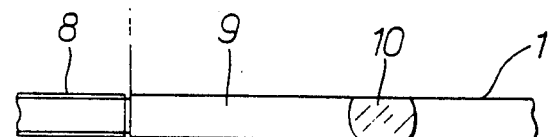

The realization of the invention will now be described in terms of the separate functions required, with a number of alternatives described for some of these:
  (a) input coupling
  (b) beam collimating
  (c) modulation/switching
  (d) beam separation
  (e) output coupling Dealing with (a) and (e) together, coupling to a fibre uses a simple butt joint, as can be seen from FIGS. 2a and 2b when the fibre 8 is coupled to a waveguide 9 in this way. For high efficiency, it is necessary to obtain a good match between the index distribution of the fibre and the waveguide, and this is achieved by the use of ion exchange guides.

Both specific methods of modulation and switching proposed here require a beam input of controlled width and divergence, and transformation from the fibre to this beam is carried out in either of two ways. The first (not shown) uses a system of thin film lenses, fabricated by ion exchange. This performs the collimation in an analogous manner to that used in bulk optics. The second system uses a tapered section of waveguide 9 fed at one end by the fibre 8 and directing the light from the fibre 8 to a diffused lens 10, which collimates the light into a parallel beam for transmission into waveguide 1.

Figure 3:
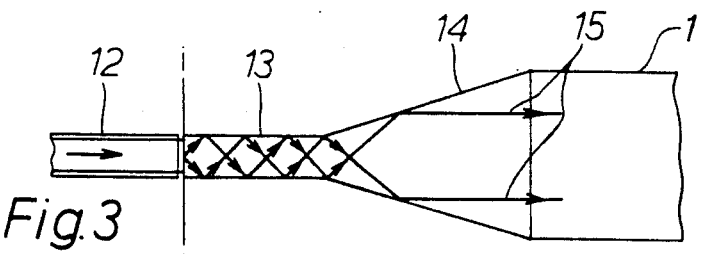
FIG. 3 shows in plan how a tapered waveguide section is used to couple an optical fibre to the interaction region.

Another application of a tapered waveguide section for collimation is shown in FIG. 3. Here the fibre 12 is aligned with a short parallel-sided waveguide section 13, which communicates with a taper section 14. The light paths 15 are as indicated, which produces a collimated beam into the body of the waveguide 1.

Modulation, in an electro-optic interaction, is realized either through the phase grating method, shown in FIGS. 4a and 4b, or through a simple electro-optic prism, FIGS. 5a and 5b. In the first case the crystal block 20 has alternate positively and negatively poled electrodes on its outer face in an interdigited pattern as shown in FIG. 4b. In the second case, the outer face of the block 3 has two triangular electrodes 21, 22 connected to opposite poles of the supply and between which the signals are applied. The latter has the virtue of simplicity and controllability, but will require a higher drive voltage.

The output beams produced by these methods are wide, and the two or more switching positions are separated by only a small angle. There are consequent problems in separating these outputs in a small substrate. One method is to use another thin film lens to bring the far field plane much nearer. The beam can then be separated here, as shown in FIG. 6, where the light passes from a deflector or grating as shown in FIGS. 4a, 4b, 5a and 5b via the lens 23 to one or other of two diffused guides each of which has a diameter which is of the order of 50 $\mu$m.

Another method might be to use a passive grating, FIG. 7, forward by a further diffusion stage into the waveguide, as an angle sensitive filter. The required degree of angular 'Q' can be achieved by long gratings with only a small index perturbation.

What is claimed is:

1. Apparatus for electro-optic modulating and/or switching multi-mode light, comprising:
  optical waveguide means made from optically transmissive material deposited on a substrate whose refractive index is less than that of the waveguide material;
  a slab of an optically transmissive material whose refractive index is higher than that of the waveguide material bonded on the waveguide material, said slab having tapered regions at each of its ends so as to enable the transfer of light from the waveguide into the slab at one end and the transfer of light from the slab into the waveguide at the other end, in which the dimensions of said waveguide and of said slab are such as to permit multimode light transmission; and
  electrode means applied to the outer face of said slab to which electrical signals may be applied for modulating the light in said waveguide.

2. Apparatus as claimed in claim 1, in which each said tapered end of the slab overlies an end of one of a pair of waveguides to be coupled, the ends of the waveguides also being tapered, the tapered ends of the slab each overlying a full depth portion of one of said waveguides.

3. Apparatus as claimed in claim 1, in which said slab consists of lithium niobate bonded to the waveguide material by a transparent adhesive whose refractive index is intermediate that of the lithium niobate and of the waveguide material.

4. Apparatus as claimed in claim 1, in which an optical fibre is coupled to one end of the waveguide by a tapered waveguide section fed at one end by the fibre and a diffused lens to receive light from said tapered waveguide section and to collimate the light into a parallel beam for transmission in said waveguide.

5. Apparatus as claimed in claim 1, in which an optical fibre is bonded to one end of the waveguide by thin film lenses which collimate light from said fibre for transmission into said waveguide.

6. Apparatus as claimed in claim 1, in which an optical fibre is butt-jointed to a section of waveguide of the same width as the fibre, which section is coupled to one end of the waveguide by a tapered waveguide section.

7. Apparatus as claimed in claim 1 in which modulation is effected using said electrode means comprising alternative positively and negatively poled electrodes in an interdigitated pattern so as to produce an electrically-induced phase-grating.

8. Apparatus as claimed in claim 1 in which modulation is effected using said electrode means comprising two triangular shaped electrodes connected to opposite poles of a supply and between which signals are applied so as to provide an electro-optic prism.

9. Apparatus for coupling two optical multimode waveguides, both of which are located on a substrate, said waveguides being made of materials whose refractive indices exceed that of the substrate, in which each said waveguide has a tapered end-portion, said coupling apparatus, comprising:
  a block of optically transmissive material having a higher refractive index than the refractive indices of said waveguides bonded over the surface of the waveguides so as to interconnect them;

tapered ends formed on the optically transmissive material at portions beyond the tapered ends of the waveguides, and in which the dimensions of said waveguides and of said optically transmissive material are such that multimode light transmission is possible.

10. Apparatus as claimed in claim 9, in which said slab consists of lithium niobate bonded to the waveguide material by a transparent adhesive whose refractive index is intermediate that of the lithium niobate and of the waveguide material.

11. Apparatus as claimed in claim 9, in which an optical fibre is coupled to one end of one of the waveguides by a tapered waveguide section fed at one end by the fibre and a diffused lens to receive light from said tapered waveguide section and to collimate the light into a parallel beam for transmission in said waveguide.

12. Apparatus as claimed in claim 9, in which an optical fibre is bonded to one end of one of the waveguides by thin film lenses which collimate light from said fibre for transmission into said waveguide.

13. Apparatus as claimed in claim 9, in which an optical fibre is butt-jointed to a section of waveguide of the same width as the fibre, which section is coupled to one end of one of the waveguides by a tapered waveguide section.

14. Apparatus as claimed in claim 9, additionally comprising electrode means applied to the optically transmissive material to which electrical signals may be applied for modulating the light in said waveguides.

15. Apparatus as claimed in claim 14 in which modulation is effected using said electrode means comprising alternate positively and negatively poled electrodes in an interdigitated pattern so as to produce an electrically-induced phase-grating.

16. Apparatus as claimed in claim 14, in which modulation is effected using said electrode means comprising two triangular shaped electrodes connected to opposite poles of a supply and between which signals are applied so as to provide an electro-optic prism.

* * * * *